US006654341B1

(12) United States Patent
Chi et al.

(10) Patent No.: US 6,654,341 B1
(45) Date of Patent: Nov. 25, 2003

(54) VIRTUAL LINE SWITCHING RING (75) Inventors: Charles Chi, Redwood City, CA (US);
William S. Kish, Monte Sereno, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/421,062

(22) Filed: Oct. 19, 1999

(51) Int. Cl.[7] .................................................. H04L 1/00
(52) U.S. Cl. ....................... 370/216; 370/228; 370/907
(58) Field of Search ................................ 370/216, 217, 370/218, 219, 220, 221, 222, 223, 224, 225, 226, 227, 228, 242, 243, 244, 246, 250, 437, 907; 359/110, 119

(56) References Cited

U.S. PATENT DOCUMENTS

| 5,179,548 A | * | 1/1993 | Sandesara | 370/217 |
| 5,218,604 A | * | 6/1993 | Sosnosky | 370/217 |
| 5,491,686 A | * | 2/1996 | Sato | 370/217 |
| 5,546,403 A | | 8/1996 | Yamamoto et al. | 371/20.5 |
| 5,661,720 A | * | 8/1997 | Taniguchi | 370/223 |
| 5,757,769 A | * | 5/1998 | Ikawa | 370/228 |
| 5,870,212 A | | 2/1999 | Nathan et al. | 359/119 |
| 6,144,633 A | * | 11/2000 | Ikeda et al. | 370/217 |
| 6,154,296 A | * | 11/2000 | Elahmadi et al. | 359/119 |
| 6,295,146 B1 | * | 9/2001 | Nathan et al. | 370/222 |
| 6,366,556 B1 | * | 4/2002 | Ballintine et al. | 370/216 |

FOREIGN PATENT DOCUMENTS

| EP | 0804001 | 10/1997 | ..................... 1/22 |
| WO | 9825365 | 6/1998 | |
| WO | 9923773 | 5/1999 | ................... 10/213 |

OTHER PUBLICATIONS

Ching et al, SONET Implementation, IEEE, pp. 34–40, Sep. 1993.*

* cited by examiner

Primary Examiner—Seema S. Rao
Assistant Examiner—Frank Duong
(74) Attorney, Agent, or Firm—Michael R. Cammarata; David L. Soltz (57) ABSTRACT At least one protection line is shared among SONET rings. Identification and availability information of the shared protection line is distributed among the switches of the SONET rings using K-byte data in the SONET overhead.

5 Claims, 12 Drawing Sheets

VIRTUAL LINE SWITCHING RING

RELATED APPLICATIONS

This application is related to U.S. patent application Ser. No. 09/259,263, filed Mar. 1, 1999, entitled "ROUTING AND SIGNALING IN A SONET NETWORK", incorporated by reference herein.

BACKGROUND OF THE INVENTION

The present invention relates to a method and system for implementing a virtual line-switched ring network; such as a line switched ring network carrying optical signals in accordance with a synchronous optical network (SONET) standard.

Figure 1:
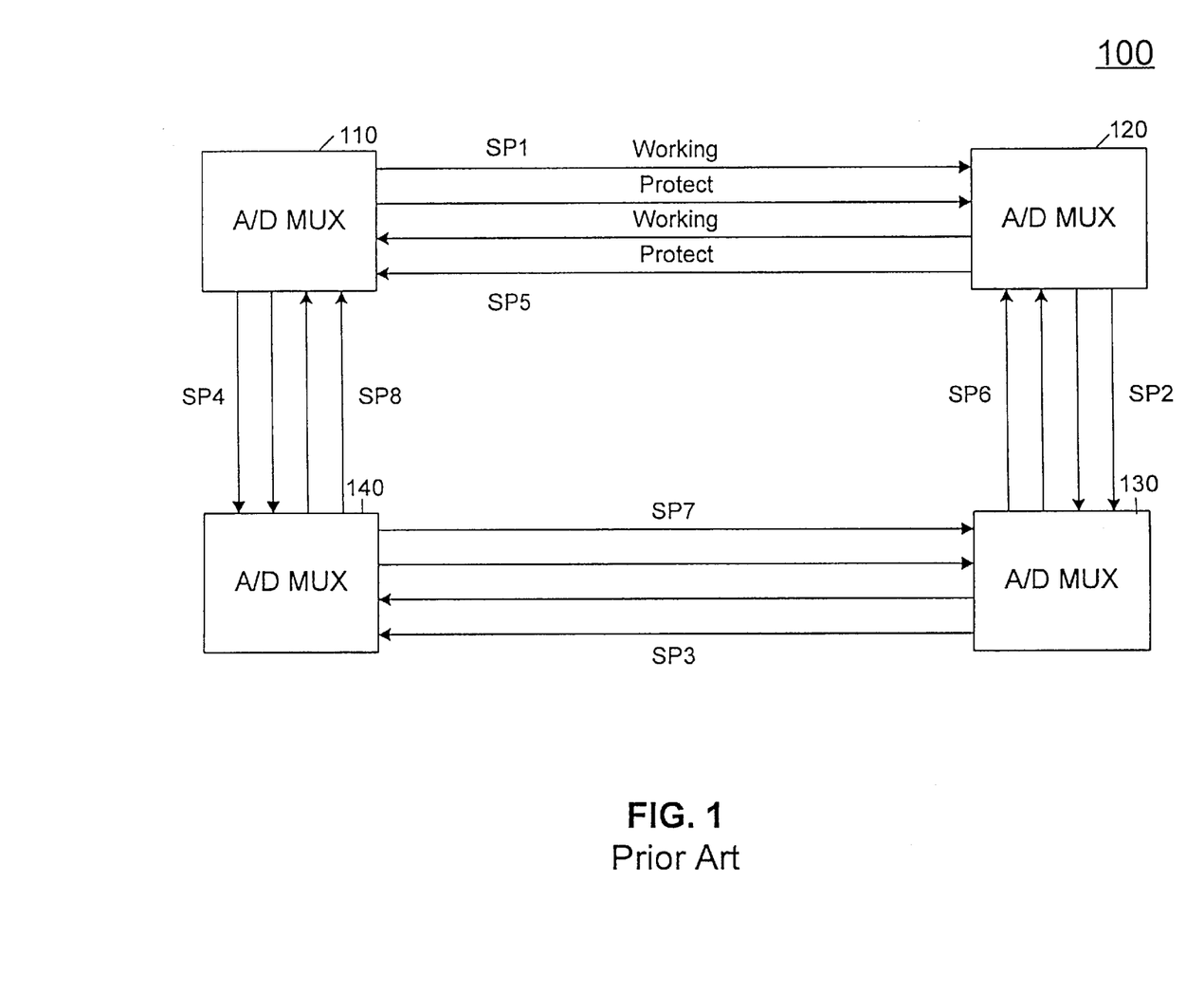
FIG. 1 shows a bi-directional line switched ring according to the prior art.

SONET networks often have a ring configuration including a collection of nodes forming a closed loop. FIG. 1 illustrates an example of a conventional SONET bidirectional ring 100 whereby information may flow in either a clockwise or counterclockwise in the figure, as indicated by arrows labeled "working" and "protect". Add-drop multiplexers (A/D mux) 110, 120, 130 and 140 add and/or drop signals to switch data from one span (SP1 to SP7) to another. Ring 100 is thus termed a "bidirectional line switched ring" or BLSR, and data transmitted in such a ring typically must conform to a particular protocol.

As further shown in FIG. 1, each of spans SP1 to SP7 includes one working line and a corresponding protection line. For example, spans SP1 and SP5 interconnect A/D muxes 110 and 120 and include working lines carrying data in opposite directions. The working lines within each of these spans further include respective protection lines for transmitting data in the event the associated working line fails.

The SONET ring provides protection for transmission of data in two way. First if a working lines fails, the corresponding protection lines may be used. In the alternative, if working lines fail between two A/D muxes, any communication route directed through the failed line may be rerouted through the A/D muxes through a process known as span switching. For example, if the working lines between A/D mux 110 and A/D mux 120 fail, instead of using the corresponding protection lines, communications may be sent from A/D mux 110 to A/D mux 120 via A/D mux 140 and 130.

Typically, the working and protect lines are provided in a fiber optic bundle. Accordingly, if the working line fails, due to a fiber cut, for example, the corresponding protect line often will also fail. Span switching is thus often preferred to simply switching data from the faulty working line to the protect line. Both schemes may be used in conjunction with each other, however, whereby an attempt is first made to use the protect line when the associated working line fails, and then, if the protection line is itself faulty, span switching is used to redirect communications.

The SONET standard has a plurality of optical levels and logical levels that represent the amount of optical information a line is capable of carrying at a given time. These different optical levels are referred to as OC-n, where n is indicative of the bandwidth or capacity associated with the line. Current SONET bidirectional rings require that all spans carry data at the same optical rate because A/D muxes can only direct communications from one line to another having the same OC-n level. Therefore, BLSR requires that all lines in the network are of the same type and that each span between A/D muxes has the same number of lines.

In accordance with the SONET standard, spans transfer units of information called Synchronous Transport Signals (STS). For the different optical carrier levels OC-n (such as OC-1, OC-3 and OC-12), there is a corresponding STS-n, where n is the number of STS-1 segments or time slots. Typical spans are composed of 1, 3, 12, 48, or 192 STS-1's. All SONET spans transmit 8,000 frames per second, where each frame is composed of an integer number of STS-1 segments, such as 1, 3, 12, 48 or 192.

Each STS-1 segment includes a payload section and an overhead section. The overhead includes K-bytes that communicate error conditions between spans in a network and allow for link recovery after network failure. K-byte signaling takes place over the protection lines. In a series of STS segments, only K-bytes from the first STS-1 segment are used to carry error data. Current SONET networks make no use of the framing overhead of the remaining STS-1 segments. The series of STS-1 segments only carries K-byte error information for a single ring.

Figure 2:
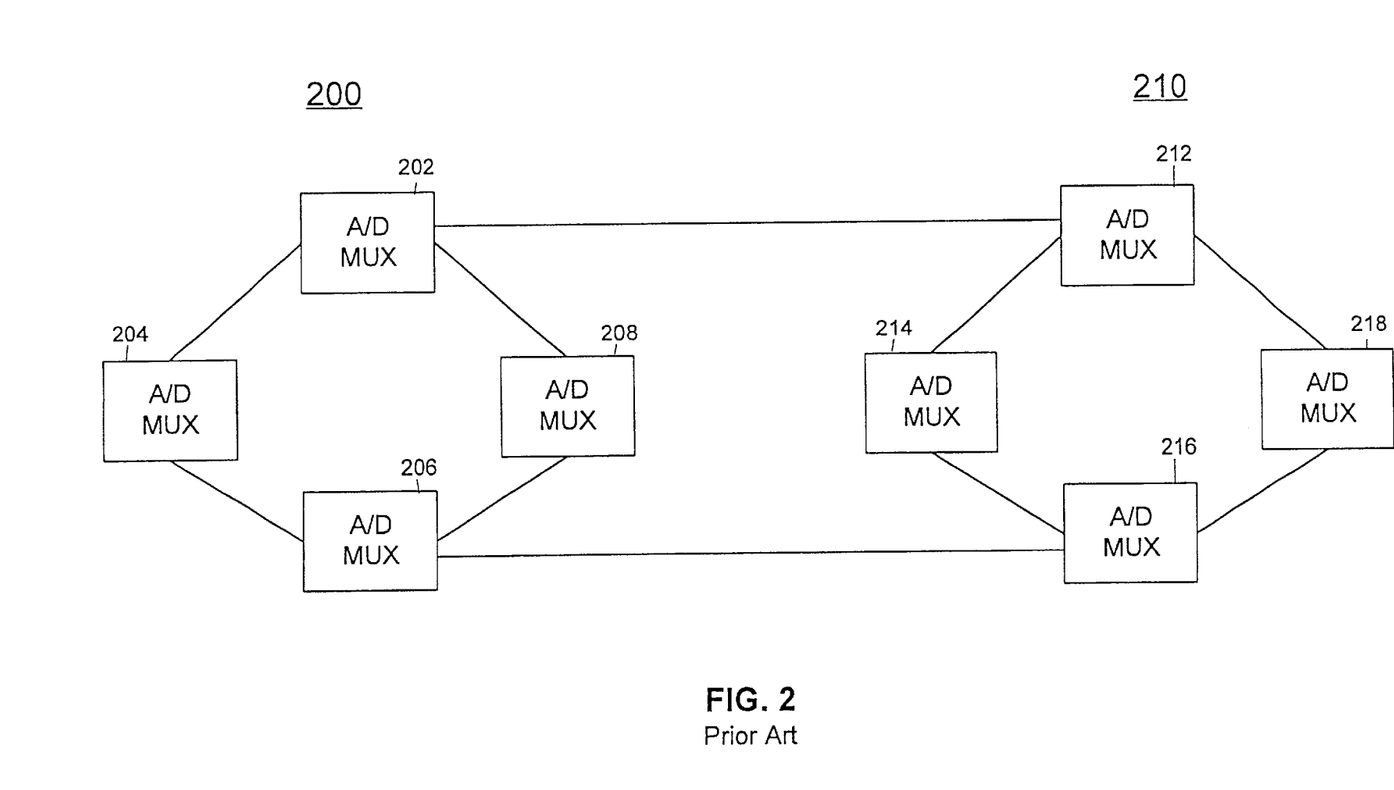
FIG. 2 shows two connected bi-directional rings according to the prior art.

FIG. 2 illustrates an example of a connection between two rings 200 and 210 using four SONET A/D multiplexors. Specifically, A/D mux 202 of ring 200 is coupled to A/D mux 212 of ring 210, while A/D mux 206 of ring 200 is coupled to A/D mux 216 of ring 210. Data is transmitted on these connections at a slower rate than through rings 200 and 210. Thus, a total of four "matched" A/D mux nodes are often required to connect two rings. Typically, each such pair of A/D muxes is dedicated to providing ring-to-ring connections, and are not configured to pass information around a ring and forward information to another ring at the same time.

In the SONET network ring environment, there currently does not exist a ring configuration that allows for spans within a single ring to have different bandwidth or for a different number of lines to exist between nodes. In addition, no current SONET network ring allows for sharing protection lines between different rings. Finally, current SONET network rings do not allow for connecting rings using a single node.

SUMMARY OF THE INVENTION

Systems and methods consistent with this invention allow for sharing a ring using a single node by using switches at the nodes in place of A/D multiplexors. Systems and methods consistent with this invention allow for sharing a protection line between different rings by utilizing unused overhead in frames sent between switches. Systems and methods consistent with this invention allow for using a different number and type of fibers or lines between switches in the same ring network by using switches and an algorithm to control changing lines in the ring.

Systems and methods consistent with this invention include structure and steps for connecting optical ring networks using a first ring network including a plurality of optical network switches and a second ring network including a plurality of optical network switches. At least one of the optical network switches is a member of both ring networks and passes information between the first and second ring networks.

In another embodiment consistent with the present invention structure and steps are provided that connect two optical ring networks with two switches where a protection line between the two switches is shared by both ring networks.

In another embodiment consistent with the invention, structure and steps are provided that add and/or remove optical carrier lines from a network, where the network includes a plurality of switches having one or more optical carrier lines between each pair of switches. A request for changing a line between two switches is received from a system administrator at one of the switches. The switch determines whether the change results in a total line bandwidth between the two switches in the network. The switch executes the line change when the change results in a total line bandwidth between the two switches being equal to a total line bandwidth between other switches in the network.

Both the foregoing general description and the following detailed description explain examples of the invention and do not, by themselves, restrict the scope of the appended claims. The accompanying drawings, which constitute a part of this specification, illustrate systems and methods consistent with the invention and, together with the description, help explain the principles of the invention.

BRIEF DESCRIPTION OF THE DRAWINGS

The accompanying drawings, which are incorporated in and constitute part of this specification, illustrate embodiments of the invention and, together with the description, serve to explain the advantages of the invention. In the drawings.

DETAILED DESCRIPTION OF THE INVENTION

The following detailed description refers to the accompanying drawings. The same reference numbers in different drawings identify the same or similar elements. Also the following detailed description does not limit the invention. Instead, the scope of the invention is defined by the appended claims.

Systems and methods consistent with the principles of the present invention provide a SONET ring network that uses switches at the nodes allowing for sharing a switch to connect a plurality of rings. The present invention also provides for sharing a protection line between a plurality of rings by utilizing overhead provided for in the SONET standard. Finally, the present invention provides for having a different number and type of lines between nodes by using switches and an algorithm to regulate the updating of the lines.

Figure 3:
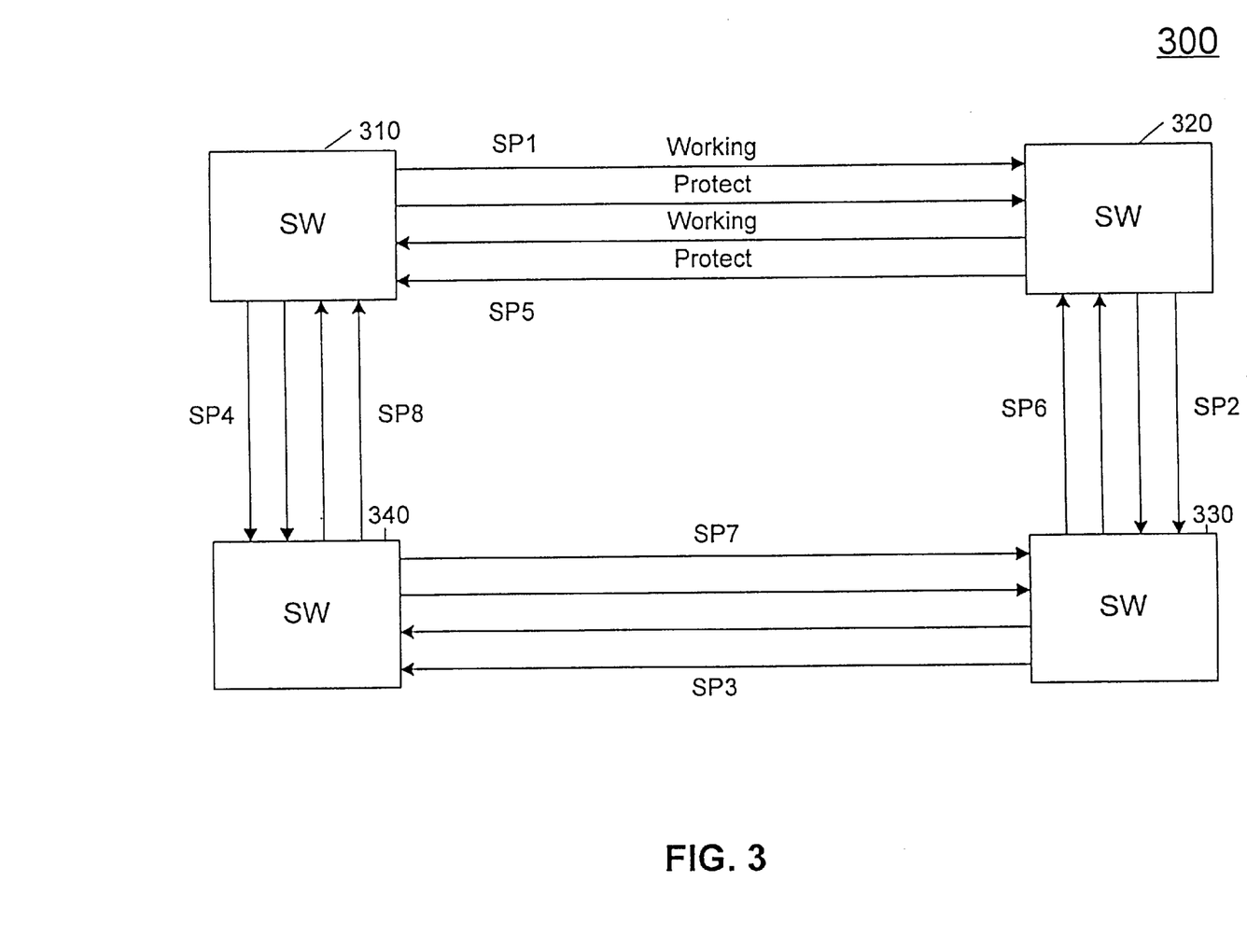
FIG. 3 shows a virtual line switched ring in accordance with the present invention.

The present invention, as shown in FIG. 3, uses switches as nodes in a SONET network. For example, SONET ring 300 includes switches 310, 320, 330 and 340 coupled to various working and protection lines. Specifically, there are two working lines and two protection lines between each pair of switches. Information is transferred through SONET ring 300, typically in a time division multiplexed fashion, through pluralities of input and output ports in each switch.

Figure 4:
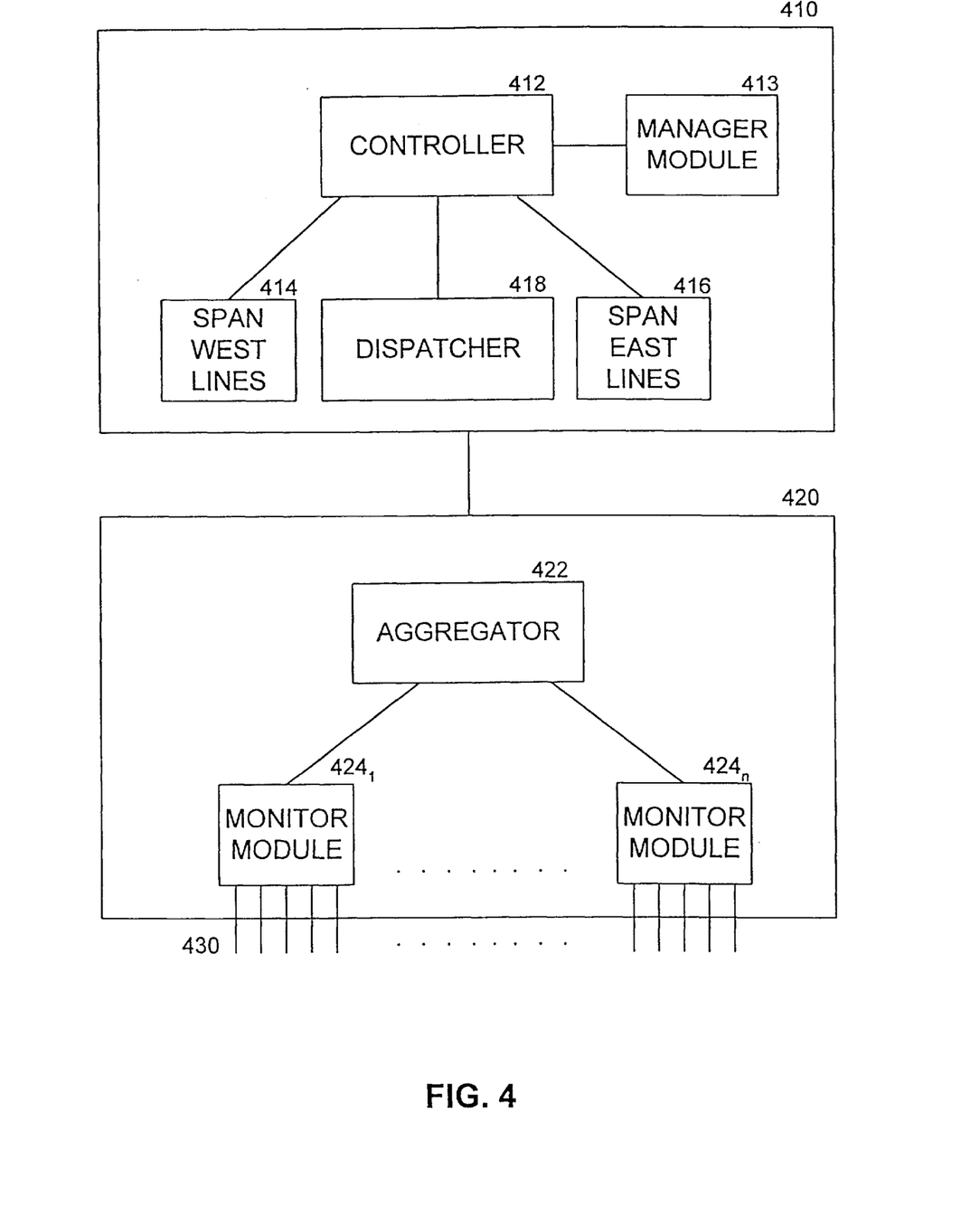
FIG. 4 shows a switch and line card in accordance with the present invention.

FIG. 4 shows an example of a switch consistent with the present invention. Switch 410 includes controller 412, manager module 413, span west lines 414, span east lines 416, and dispatcher circuit 418. Controller 412 oversees general operations at the switch 410 and is used by manger module 413 and dispatcher 418 to process and forward information. Manger module 413 manages virtual lines of span west lines 514 and span east lines 416. Dispatcher 418 receives and process data from external sources.

Switch 410 is connected to a line card 420 having an aggregator 422 and a plurality of monitor modules $424_1$ to $424_n$. Aggregator 422 gathers information from monitor modules 424 and passes the information to appropriate switches via monitor modules 424. Each monitor module 424 has a plurality of physical SONET lines 430 that connect to other switches. Physical lines 430 are logically designated by switch 410 to correspond to virtual lines associated with the span west lines 414 and span east lines 416. Span west lines 414 and span east lines 416 define the logical mapping between physical lines and logical lines, where the logical lines may come from any combination of monitor modules 424. The designation of west and east lines is only a logical designation. This logical designation is used to distinguish between the different network nodes to which switch 410 is connected. In one embodiment, the span west lines 414 define logical lines leading to one switch in the network, while the span east lines 416 define logical lines leading to another switch in the network.

Figure 5:
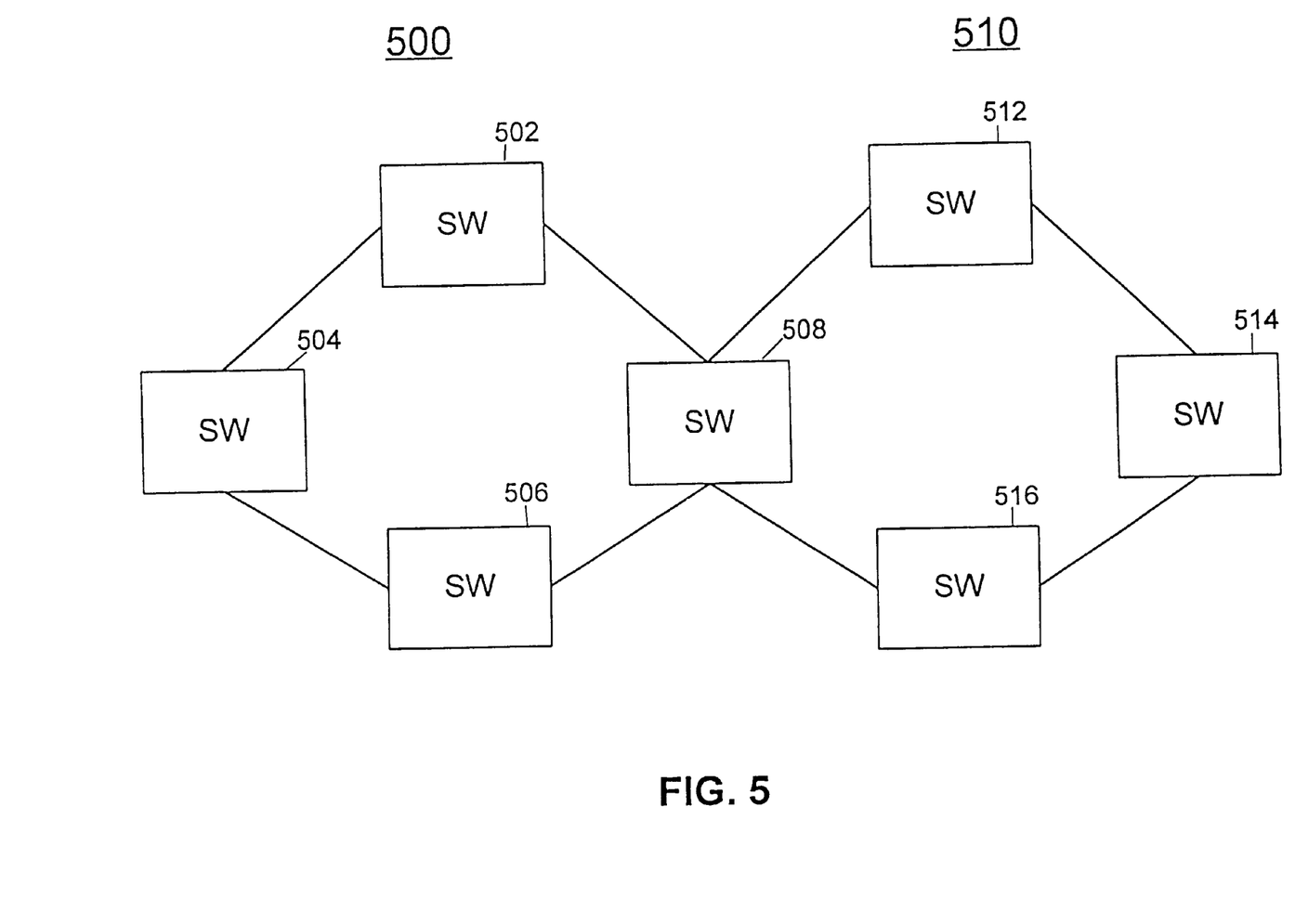
FIG. 5 shows two connected virtual line switched rings in accordance with the present invention.

Since switch 410 simultaneously transfers information between a plurality of different SONET lines of information, the present invention allows for two rings to share a switch, or be connected by sharing a switch. For example, as seen in FIG. 5, SONET network ring 500 and SONET network ring 510 are connected by sharing switch 508. Ring 500 includes switches 502, 504, 506, and 508. Ring 510 includes switches 508, 512, 514, and 516. By using a single switch to connect rings, information is passed over SONET lines at the same rate between rings as is passed within a single ring.

Figure 6:
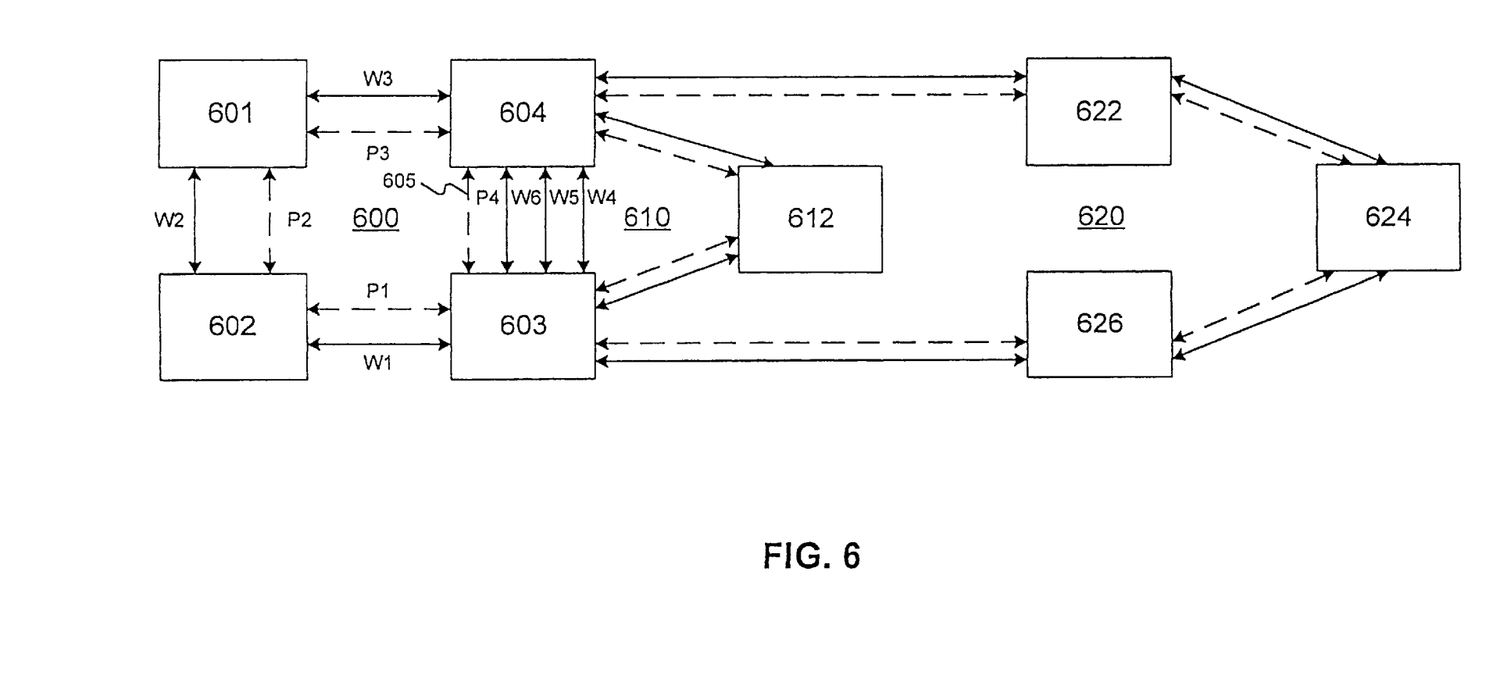
FIG. 6 shows three connected virtual line switched rings sharing a protection line in accordance with the present invention.

More than two SONET rings may share a switch. As shown in FIG. 6, three SONET rings share two switches. Ring 600 includes switches 601, 602, 603, and 604. Ring 610 includes switches 603, 604, and 612. Ring 620 includes switches 603, 604, 622, 624, and 626. As further illustrated in FIG. 6, each working and protect line in ring 600 is assigned a particular identifier, e.g., working line one (w1) and protection line 1 (p1).

In addition to sharing switches among rings, the rings of FIG. 6 share protection line p4 (605). Moreover, between each switch and its neighbor there is a working line, which is shown as a solid line, and a protection line, which is shown as a dotted line. Three working lines connect switch 603 to switch 604, one for each ring, and one protection line 605 which is shared by all of the rings. The sharing of a protection line is not required between these switches; three dedication protection lines could have been provided between these two switches instead. When rings share a protection line, however, the protection line is allocated for use on a first-come, first served basis. Individual STS-1 segments on the protection line are allocated to replace the working lines on an STS-1 segment basis. One protection line may carry portions of STS-1 segments from more than one working line.

Multiple rings may share a protection line by utilizing K-byte signaling on multiple STS-1 segments. As previously discussed, K-bytes carry error information related to line failures for a ring. Errors noted in the K-byte may initiate switching between a working and protection line. For example, criteria for switching between a working and protection lines are generally the same, and may include loss of signal, loss of frame, an alarm indication signal, or a single failure. In which case, K-byte codes may include: block out of protection code, forced span switch code, forced ring switch code, signal fail-span code, signal fail-ring code, and signal degrade code, among others.

Conventional BLSR only allows for one ring to use a protection line and only uses the first K-bytes from the first STS-1 in a series of STS-1 segments to report errors for the single ring. Even though not used, the current SONET protocol includes K-byte overhead in each STS-1 of a series of STS-1 segments for additional rings. The present invention uses these K-bytes in the succeeding STS-1 segments to realize shared protection lines. In particular, each ring has separate K-byte information to reflect errors within the ring. When one or more rings use a protection line, the K-byte information is carried over that protection line for each ring, and is carried in respective sequential STS-1 segments. The switches on either end of the protection line that is being shared are programmed with information defining which STS-1 segment is carrying the K-byte information for which ring. For example, the first segment may contain the K-byte information for ring 610, and the third segment contains the K-byte information for ring 620. Switches 603 and 604 are thus programmed with information defining which STS-1 segment carries the K-byte information for which ring based on the received order of the STS-1 segments. In addition, K-byte information concerning the availability of a particular protection line is passed to other switches in the rings through appropriate signalling, as discussed in greater detail below.

Returning to FIG. 4, monitor module 424 monitors incoming K-bytes. More particularly, monitor module 424 monitors incoming K-bytes for changes indicating an error. When a K-byte change for a particular ring is maintained for at least three consecutive frames monitor module 424, monitor module 424 reads the value of the K-bytes and sends the change to aggregator 422. Aggregator 422 queues the K-byte information from other monitor modules 424, and after a period of time, such as one millisecond, sends a message to switch 410 that includes the K-byte changes, and the lines that have signal failure or degradation. Dispatcher 418 parses the message from the aggregator 422 and sends line information to span west lines 414 or span east lines 416 if either of these utilize the line in question. The span receiving the line information may do nothing if higher priority conditions exist, or may initiate a line switch, ring switch, or route change.

Figure 11:
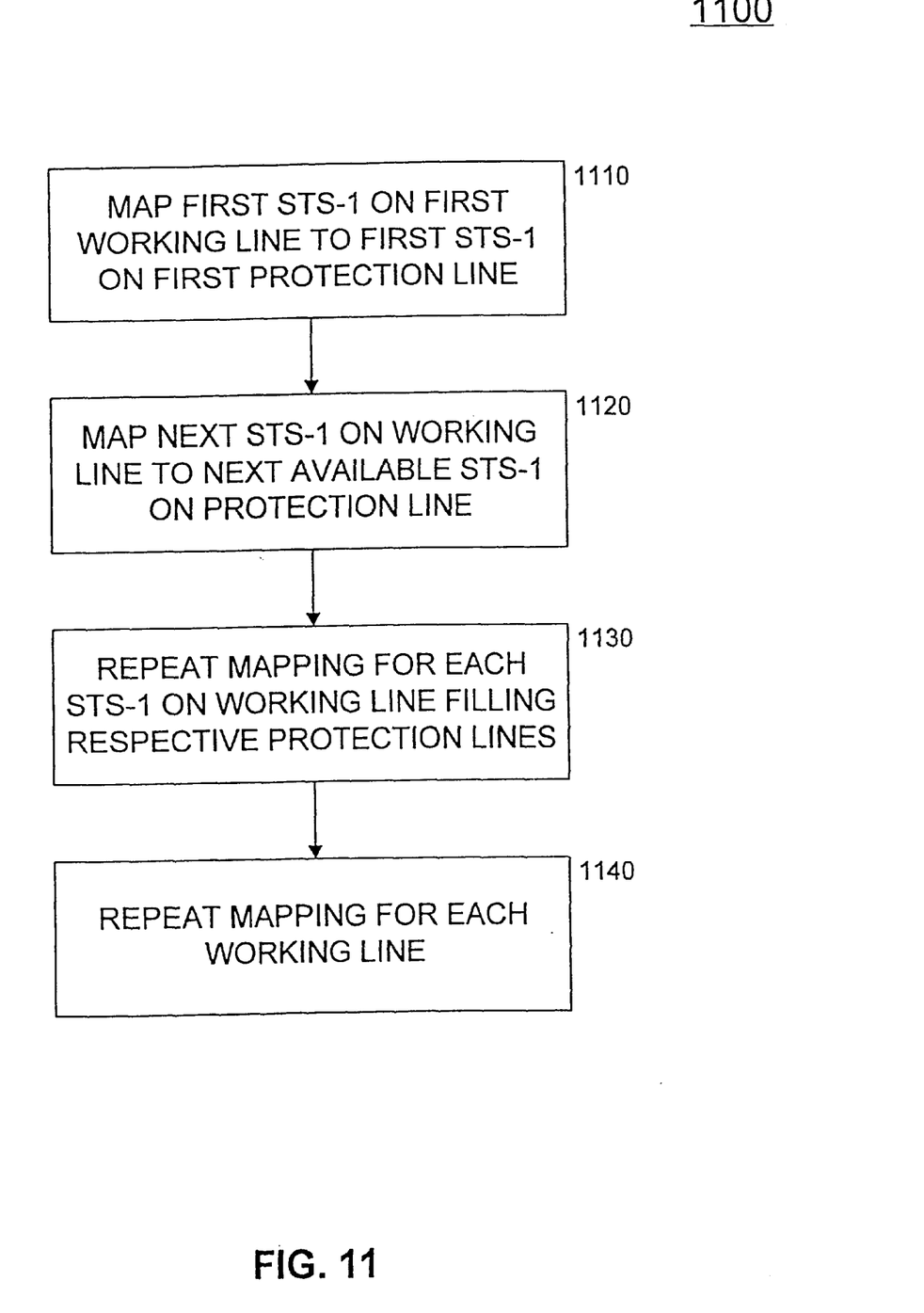
FIG. 11 illustrates a process for assigning working lines to protection lines.

FIG. 11 illustrates steps of a process 11 for mapping working lines to corresponding protections lines. The mapping is performed on a first-come, first served basis, and should conform to an ordering dictated by a network administrator. In a first step 1110, a first STS-1 on a first working line is mapped to a first STS-1 of a first protection line. In step 1120, the next STS-1 of the working line is mapped to the next available STS-1 of a protection line. Each remaining STS-1 of the working line is mapped to a respective STS-1 on a protection line (step 1130). Steps 1110 through 11130 are repeated for each remaining working line (step 1140).

Figure 12:
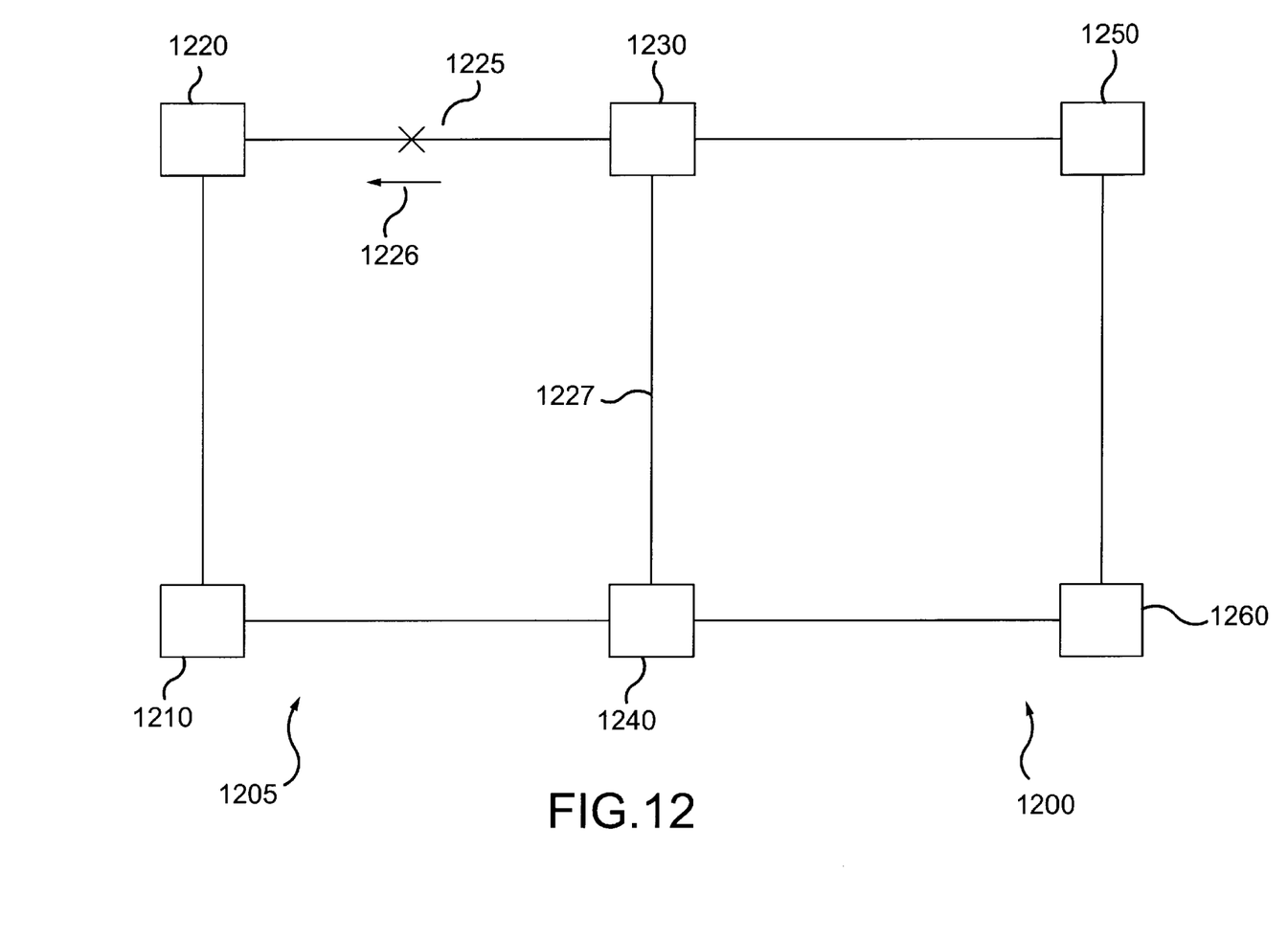
FIG. 12 illustrates two SONET ring networks configured in accordance with a feature of the present invention.

The invention will next be described by way of example with reference to FIG. 12 showing first and second rings 1200 and 1205. Within ring 1200, working traffic originating at switch 1230 and terminating at switch 1220 is passed along span 1225 in a east-west direction as indicated by arrow 1226. If a break occurs in span 1226 (as indicated by an "X"), traffic is rerouted through switches 1210 and 1240 using a shared protection line in span 1227, which is assigned in accordance with processes and structures identified above. In this case, a K-byte ring switch signal is supplied from switch 1230 to switch 1240 and then to switches 1210 and 120 to thereby indicate use of the protection line in ring 1205, at least for particular time slots so affected by the break in span 1226. Switch elements in ring 1200, however, must further follow an arbitration protocol whereby the protection line in span 1227 is rendered not available to them, at least for those time slots. Accordingly, switch 1230 passes known K-byte lockout-protection span (LP-S) data to switch 1240, which in turn, forwards this data to remaining switches 1260 and 1250 in ring 1200. Thus, information concerning availability of a particular protection line, as well, as information concerning a fault in a particular span is distributed amongst the switching elements of a given network through K-byte signaling.

Figure 7:
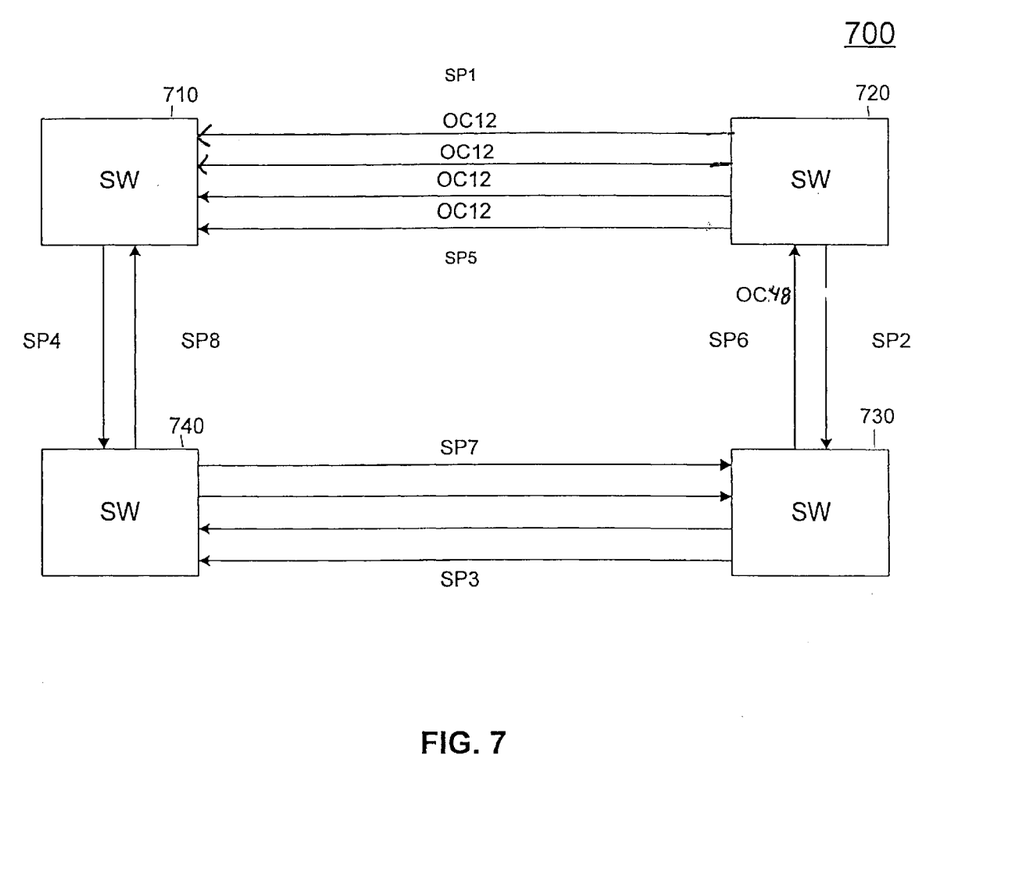
FIG. 7 shows a virtual line switched ring having varying numbers and types of lines between switches in accordance with the present invention.

In another embodiment, systems and methods consistent with the principles of the present invention utilize a varying number and type of lines between switches in a SONET ring network. As discussed above, current SONET networks require the same number of optical carrier level type of lines between nodes. The present invention, however, allows for different combinations of optical carrier lines between switches, thereby providing greater network flexibility. Switch 410 has a plurality of ports and can split information from one line into many lines, or combine information from many lines and output the information on a single line. As shown in FIG. 7, SONET ring network 700 has switches 710, 720, 730, and 740. The connections between these switches are not the same for every span. For example, between switch 710 and switch 720, there are two optical carrier 12 (OC-12) working lines in each direction. Between switch 720 and switch 730, there is one OC-48 working line going in each direction between the switches. Consistent with the present invention, any combination of optical carrier levels may be combined between spans as long as the total capacity of the span between two switches equals the total capacity between other switches in the ring. In addition, the sum of the capacities of the working lines between two switches must equal the sum of the capacities of the protection lines between the switches. In the ring network shown in FIG. 7, for example, the sum of the optical capacities between each set of switches is a total of OC-48. This total may be reached using any combination of OC carrier lines. For example, the spans between switches 710 and 720 reach this total using four OC-12 lines while the spans between switches 720 and 730 reach this total using one OC-48 line. Switches 710, 720, 730, 740 direct traffic from a single OC-48 to four OC-12 lines.

Figure 8:
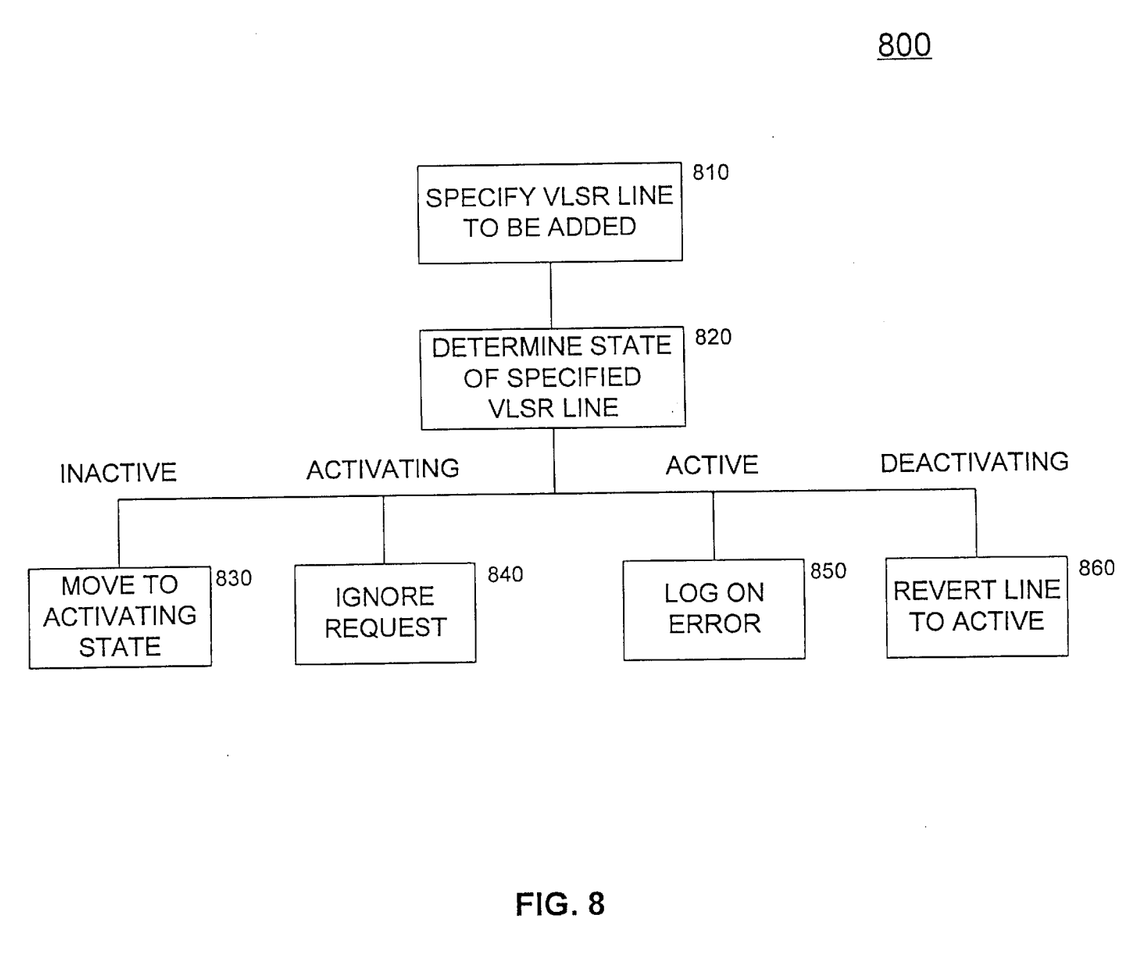
FIG. 8 shows the steps of adding a line to a virtual line switched ring in accordance with the present invention.

Moreover, in accordance with the present invention, lines may easily be added or removed from the ring. However, before a line is made active or inactive, the switches on both sides of the line determine whether the line change maintains the required optical carrier capacity between switches. FIG. 8 shows the steps 800 performed by manager module 413 when adding a line. First, a system administrator specifies the line to made active by inputting a request, including a line identifier, into manager module 413 at a switch at either end of the new line (step 810). This line ID must be the same on both ends of the line. All of the switches identify the line using the same identifier, as discussed above with respect to FIG. 6. Manger module 413 determines the state of the specified line from the monitor modules 424 (step 820). Monitor modules 424 maintain information regarding the state of each line based on the line identifier. Lines are only used for actual transmission when in the active state. The activating state refers to the state before monitor modules 424 on either side of a line have agreed to placing a line in the active state. Similarly, the deactivating state is the state before the monitor module have agreed to placing a line in the inactive state. When a line is physically added, the monitor module 424 automatically designates the line as being in an inactive state. If the line to be added is in fact inactive, then the line is moved to the activated state (step 830). If however, the specified line is already in the activating state, then manager module 413 ignores the request (step 840). If the line specified is already active, then manager module 413 logs an error in a central accessible log (step 850). If the specified line is in a deactivating state, then manager module 413 directs the monitor module 424 to place the line back in the active state (step 860).

Figure 9:
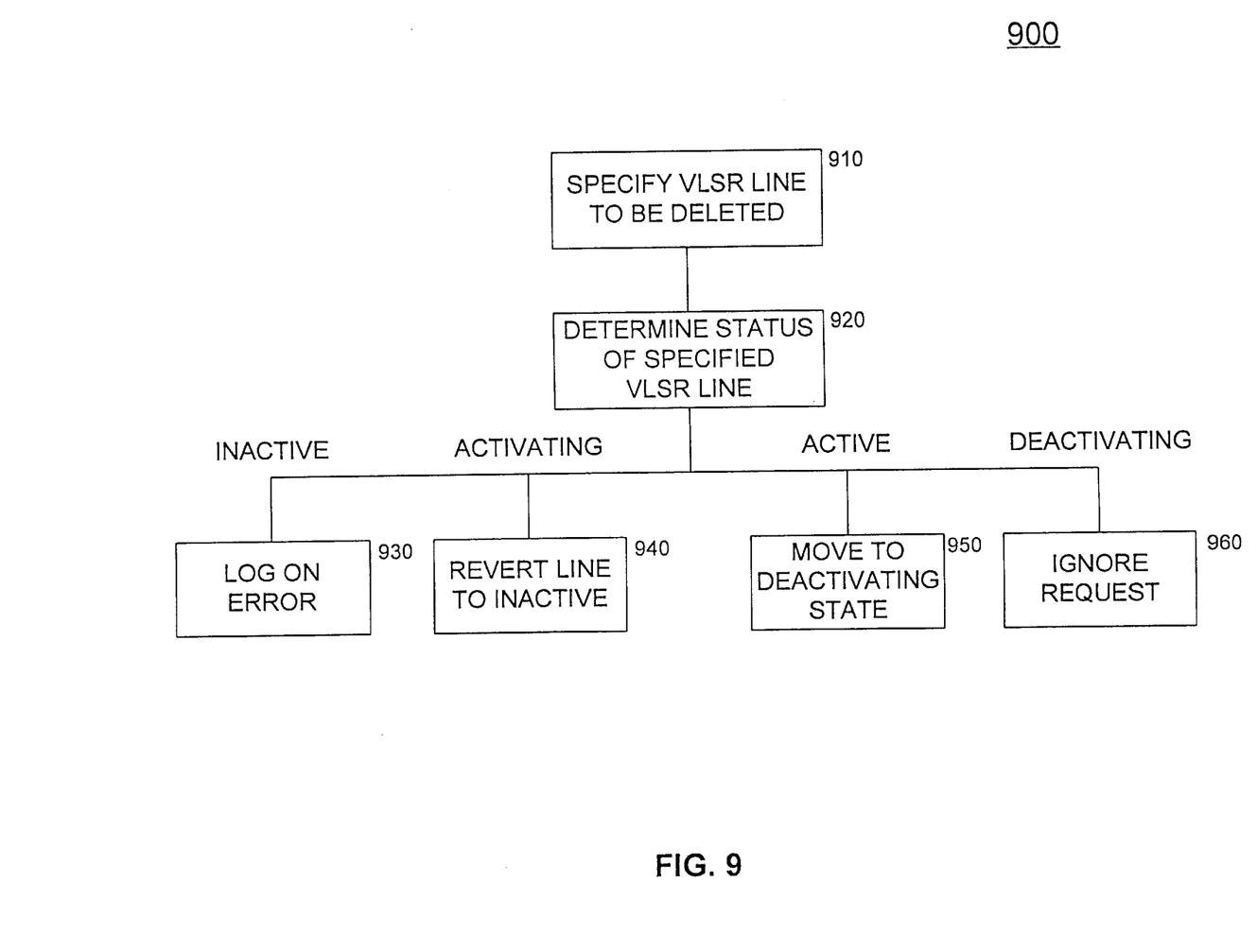
FIG. 9 shows the steps for deleting a line form a virtual line switched ring in accordance with the present invention.

FIG. 9 shows the steps 900 performed by manager module 413 when deleting a line. First, a system administrator specifies the line to be deleted by inputting a request, including a line identifier, into manager module 413 at a switch at either end of the line (step 910). Manager module 413 queries monitor module 424 to determine the status of the specified line (step 920). If the specified line is inactive, then manager module 413 takes an error in a central accessible log and does not take further action (step 930). If the designated line is in the activating state, then manager module 413 directs monitor module 424 to revert the line to an inactive state (step 940). If the specified line is in the active state, then manager module 413 directs monitor module 424 to place the BLSR line in a deactivating state (step 950). If the specified line is already in the deactivating state, then manager module 413 ignores the request (step 960).

Figure 10:
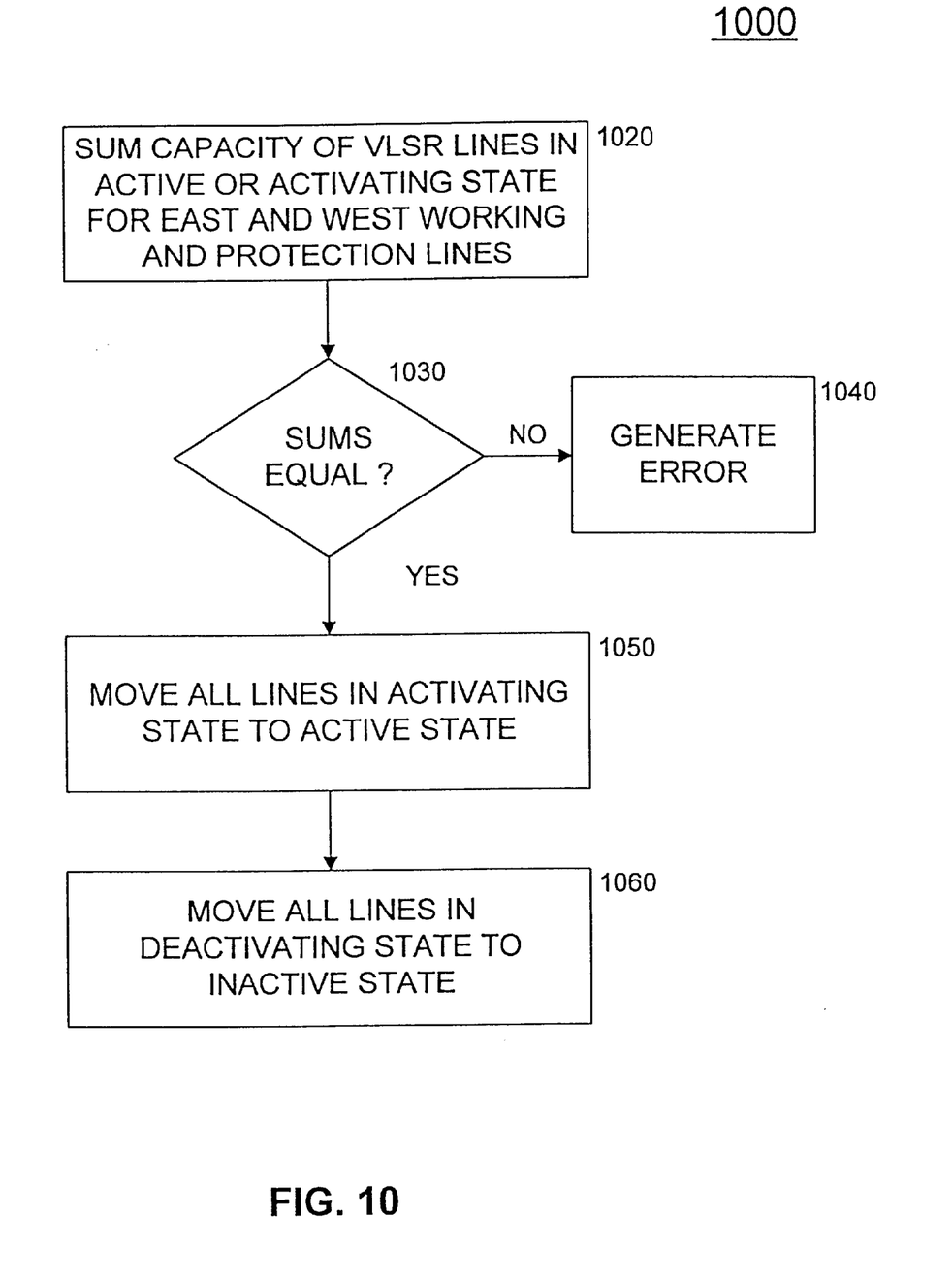
FIG. 10 shows the steps for validating a new line configuration in a virtual line switched ring in accordance with the present invention.

FIG. 10 shows steps 1000 performed by manager module 413 when validating a new configuration of lines after lines have been added or deleted. To validate the configuration, manager module 413 first sums the capacity of the lines associated with span west lines 416 that are in the active state or activating state (step 1020). The sum of the capacity of the active lines in the span west lines 414 should equal the summation of the capacity of the active lines in the span east lines 416. Manager module 413 determines whether these sums are equal (step 1030) and, if not, an error is generated and logged (step 1040). If the sums are equal, then manager module 413 directs monitor modules 424 to move all of the lines in the activating state to the active state (step 1050). Similarly, manager module 413 directs the monitor modules to move all the lines in the deactivating state to the inactive state (1060). Manager module 413 in each switch in the ring network performs this check before validating any configuration.

In conclusion, the SONET ring network of the present invention uses switches as the network nodes to allow sharing a switch to connect a plurality of rings. A protection line between a plurality of rings is shared by utilizing overhead provided for in SONET standard protocols. Moreover, the shared protection line can be used by one ring over a first time slot and a second ring over a second time slot. Thus, capacity which would otherwise be used for carrying dedicated protection traffic is utilized by additional working traffic instead. As a result, network capacity is increased without adding more physical lines. Finally, the present invention provides for having a different number and type of lines between switches in a ring network by using switches and an algorithm to regulate the updating of the lines.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication method comprising:
    monitoring failure related information associated with a working segment of a first communication network;
    assigning a protection segment of said first communication network to carry data associated with said working segment of said first communication network, said protection segment being common to a second communication network; and
    transmitting said data through said working segment in accordance with a SONET standard,
    wherein said assigning step includes:
        assigning said protection line to said first network over a first time slot; and
        assigning said protection line to said second network over a second time slot.

2. A communication method in accordance with claim 1, wherein said monitoring step comprises the step of detecting K-byte data in a plurality of succeeding STS-1 time slots.

3. A communication method in accordance with claim 1, further comprising the step of conducting an arbitration in accordance with a Signal Fail Protection K1 priority code concerning said shared protection line.

4. A communication method in accordance with claim 1, further comprising the step of distributing data concerning said shared protection line among pluralities of switch elements in said first and second networks.

5. A communication method in accordance with claim 1, wherein said first and second networks have a ring configuration.

* * * * *